No. 785,527. PATENTED MAR. 21, 1905.
G. H. SWEZEY.
MEANS FOR MOISTENING AND SEALING ENVELOPS.
APPLICATION FILED MAY 9, 1904.
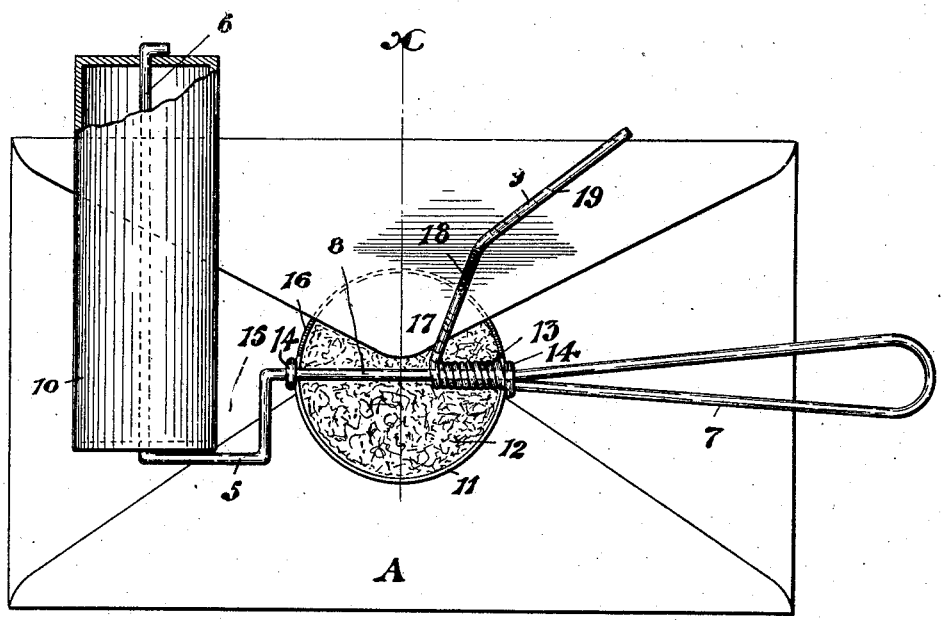
Fig. 1.
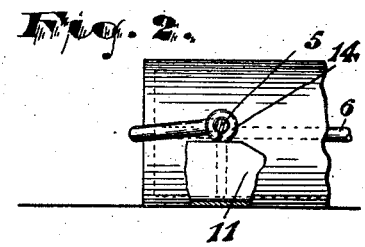
Fig. 2.
Fig. 3.
WITNESSES:
Ralph Lancaster
Russell M. Everett
INVENTOR
George H. Swezey,
BY
Charles H. Pell,
ATTORNEY No. 785,527.                                                                                  Patented March 21, 1905.

UNITED STATES PATENT OFFICE.

GEORGE H. SWEZEY, OF IRVINGTON, NEW JERSEY.

MEANS FOR MOISTENING AND SEALING ENVELOPS.

SPECIFICATION forming part of Letters Patent No. 785,527, dated March 21, 1905.

Application filed May 9, 1904. Serial No. 207,065.

*To all whom it may concern:*

Be it known that I, GEORGE H. SWEZEY, a citizen of the United States, residing at Irvington, in the county of Essex and State of New Jersey, have invented certain new and useful Improvements in Means for Moistening and Sealing Envelops; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The objects of this invention are to provide an envelop moistener and sealer of greater simplicity and cheapness of construction, to facilitate the sealing operation and secure a more perfect fastening of the envelope, and to obtain other advantages and results, some of which may be referred to hereinafter in connection with the description of the working parts.

The invention consists in the improved envelop moistener and sealer and in the arrangements and combinations of parts of the same, all substantially as will be hereinafter set forth, and finally embraced in the clauses of the claim.

Referring to the accompanying drawings, in which like characters of reference indicate corresponding parts in each of the several figures, Figure 1 is a plan of my improved device in connection with an envelop, showing the parts in relative position while the envelop is being sealed. Fig. 2 is a detail section showing a portion of the sealing-roller and contiguous parts, the section being taken at line *x* of Fig. 1; and Fig. 3 is a sectional detail of the device, taken on the same section-line, but looking in the opposite direction.

In said drawings, A indicates the envelop undergoing the sealing operation.

5 indicates the frame of the moistener or sealing apparatus or implement, which comprises a piece of bent wire having at one end a pivotal extension 6, on which a sealing-roller 10 is arranged, and at the opposite end having a handle 7, by means of which the implement is conveniently manipulated.

At a point about midway between the handle and the pivotal extension is formed a straight shank 8, which lies in a line perpendicular to the line of the pivotal extension 6, as indicated in Fig. 1. Suspended from said shank 8 is a moistening-pan 11, one side of which is beveled at its upper edge, as shown at 16 clearly in Figs. 1 and 3, the said pan being adapted to receive a sponge 12 and being suspended from the shank 8, preferably by ears 14, which ears are adapted to permit the pan to move pivotally on said shank, whereby said pan and the sponge therein can readily accommodate themselves to the changes of position of the roller resulting from the resiliency of the wire and other varying conditions. The wire of the frame, between the said pan 11 and pivotal extension 6, is bent to form a roller-receiving aperture 15, into which one end of the roller 10 projects, as shown in Fig. 1, whereby the shank 8 will lie in alinement with a portion of the roller lying in or back from the end thereof projecting into the aperture 15.

The handle 7 is preferably in the form of a loop, one end of the wire after being looped to form said handle being spirally twisted around the shank, as at 13, at a point over the pan 11, and being then extended laterally, as at 9, to form a pressing arm or guide, the said arm in end elevation, as in Fig. 3, being inclined laterally upward from the shank, as at 17, then laterally inclined downward, as at 18, in a direction approximating the inclination of the beveled edge of the pan 11, then at its free extremity extending in a direction approximately parallel with the inclination 17, as at 19, the rounded angle formed by the inclines 18 19 serving to press the gummed flap of the envelop down upon the wet sponge, the contact of the gummed surface with the sponge being facilitated by the bevel at the upper edge of the pan.

In operating the device the flap is inserted by the hand between the pressing-arm and sponge, as indicated in Fig. 1, after which the implement is pushed or pulled, the roller 10 passing over the flap and pressing the wet gummed surface against the body of the envelop to seal the same.

Having thus described the invention, what I claim as new is—

1. The improved moistening and sealing implement for envelops, comprising a body or frame of bent wire having a looped handle at one end, a pivotal extension at the other end and a shank intermediate of said handle and extension, said body or frame having a presser-arm at one side thereof, a pan and sponge suspended from said shank and a roller arranged on said pivotal extension.

2. The improved moistening and sealing implement for envelops, comprising a body or frame of bent wire having a shank, a looped handle at one end and a pivotal extension at the other end perpendicular to said shank, the wire being extended from the looped handle laterally and bent upwardly and downwardly on inclined lines, a pan suspended from said shank, means contained in said pan for applying moisture to the flap, and a roller mounted on said pivotal extension, substantially as set forth.

3. The improved moistening and sealing implement for envelops, comprising a body or frame of bent wire having a shank, a looped handle at one end and a pivotal extension at the other end perpendicular to said shank, the wire being extended from the looped handle laterally and bent upwardly and downwardly on inclined lines, a pan having a beveled upper edge suspended from said shank, means contained in said pan for applying moisture to the flap, and a roller mounted on said pivotal extension, substantially as set forth.

4. The improved moistening and sealing implement for envelops, comprising a body or frame of bent wire having a shank, a looped handle at one end and a pivotal extension at the other end perpendicular to said shank, the wire being extended from the looped handle spirally around the shank, and laterally, and bent upwardly and downwardly on inclined lines, a pan suspended from said shank, means contained in said pan for applying moisture to the flap, and a roller mounted on said pivotal extension, substantially as set forth.

5. The improved moistening and sealing implement comprising a frame having a shank, an extension at one end of and perpendicular to said shank, carrying flap-sealing means, a handle in the line of said shank, a presser-arm having a downward inclination, and a pan with a beveled upper edge inclined approximately in the direction of the downward inclination of the presser-arm, substantially as set forth.

6. The improved moistening and sealing implement, comprising a frame having a shank, a roller at one end of and perpendicular to said shank, for flap-sealing means, a handle in the line of said shank, a presser-arm inclined downward, and a pan with a beveled upper edge inclined approximately in the direction of the downward inclination of the presser-arm, substantially as set forth.

In testimony that I claim the foregoing I have hereunto set my hand this 3d day of May, 1904.

GEORGE H. SWEZEY.

Witnesses:
CHARLES H. PELL,
FREDERICK BRENNEMAN.